Patented May 11, 1937

2,080,078

UNITED STATES PATENT OFFICE 2,080,078

MOLDING COMPOSITION AND PROCESS OF MAKING SAME

William H. Mason, Robert M. Boehm, and Wilbur Euclid Koonce, Laurel, Miss., assignors to Masonite Corporation, Laurel, Miss., a corporation of Delaware No Drawing. Application January 26, 1935, Serial No. 3,640

18 Claims. (Cl. 92—1)

This invention relates to a molding composition and process of making same, and especially to such a composition made by heat treatment of ligno-cellulose material. The present application is a continuation in part of our application Ser. No. 720,246, filed April 12, 1934.

The principal object of the invention is the provision of an improved process of making, from ligno-cellulose material alone, a molding composition containing the constituents for giving the "resin" effect and constituents for giving the "filler" effect requisite in molding operations, and adapted to be molded into products of high density and water resistance, and which products are substantially amorphous in the sense of being practically devoid of discernible fiber structure, such as claimed generically in the application of Howard and Sandborn, Ser. No. 3,646, filed on even date herewith.

A further object consists in the provision of superior molding material and provision of molded products of superior character.

A further object consists in the provision of a process for producing an alteration of the fiber structure throughout substantially the entire amount of ligno-cellulose material taken for treatment to convert it into a state adapted for molding, by heating with steam above a critical temperature which, for pine wood, is about 210° C. but which varies for different raw materials, being in general somewhat lower for annual crops such as corn stalks for example, and which conversion may be followed by grinding and/or by explosive discharge from the region of high pressure, so that the predominant proportion of and preferably the entire body of ligno-cellulose material is altered and disintegrated by treating with steam and exploding by release of the steam pressure and thereby adapted for use as a valuable molding composition material.

A further object consists in providing a process for forming the molding composition by steam treatment for a sufficient time at or above the critical temperature of the material used, and molding to a product of high density, water resistance and wet strength at a temperature lower than the critical temperature.

Further objects will appear from the following description of embodiments of the invention.

In the manufacture of fiber boards from coarse ligno-cellulose fiber produced by exploding wood chips with steam in a "gun" such as described in patent to W. H. Mason No. 1,824,221, solid fine material amounting to about five to eight percent of the total weight of the fiber is produced, and this solid fine material is discarded and sent to waste in order to avoid causing surface defects in the product made of the coarse fiber.

Such waste solid fines material, alone and with nothing else except a small percentage of water, can be molded at moderate temperatures, as for example 175° C., and moderate pressures commonly used in molding operations, as for example 2000# per square inch, into valuable products of about 1.40 or 1.45 specific gravity and which can be submerged in water for a day or more with but little water absorption or loss of strength.

Use of such solid fines material for making molded products is not claimed herein, being claimed, together with broader claims in the application of Guy C. Howard and Lloyd T. Sandborn, Serial No. 3,646 filed on even date herewith.

Such solid fines, while constituting a valuable molding composition material, is subject to several objections and limitations: concentration of the solid fines is difficult since they are discharged from the board making operation suspended in two or three hundred times their weight of water. The solid fines material, when concentrated, is extremely "slow", has high affinity for water, and is difficult to form into sheets. The manufacture of molding composition from such solid fines is entirely dependent upon, and subject to, the conditions of the fiber board manufacture as to raw material used, quality and quantity of said fines obtainable, location of supply, control of production, and presence of extraneous and sometimes undesirable sizing, coloring, fire proofing and decay proofing and other substances used in board making.

Applicants have found that the limitations and objections encountered to the use of such small percentage of solid fines for molding composition can be avoided by the present invention, which enables alterations to state suitable for molding to be obtained of the fiber structure throughout substantially the entire amount of ligno-cellulose material taken for treatment. Applicants have also found that considerable improvement can be obtained over the molded products made from such fines from the standpoints of water absorption, swelling, retention of surface smoothness and appearance and resistance to fading when exposed to light.

The fibrous ligno-cellulose starting material, which may be secured from trees and woody annual or perennial plants, is reduced to somewhat divided state, preferably by being chipped or hogged into small pieces, and screened to uniform size, or same may be in the form of sawdust or other readily available fragment sizes. The fibrous ligno-cellulose starting material must contain a sufficient portion of the fiber encrusting substances containing lignin to impart high water-proofness and permanent strength to the molded product. Preferably the material taken for treatment is raw wood, which is the most readily available source of the fibrous ligno-cellulose substance, and contains (together with cellulose) all of the lignin and other natural non-cellulose matter, i. e., constituents other than cellulose. Chemically digested cellulose fiber, such as soda pulp, for example, from which the non-cellulose constituents have been removed, is not adapted for the purposes of the invention.

As hereinbefore mentioned, the critical temperature varies for different raw materials. For pine chips a temperature of 210° C. or higher is required but other materials may be treated satisfactorily below this temperature, some of the cereal straws reacting satisfactorily at 180° C. The length of time the material is exposed to any given temperature above the critical temperature is many times longer than can be used in making principally coarse fiber with the Mason gun for example. The time to be used with our invention also varies with different raw materials and must be determined for the material in question, which can readily be done in the light of the disclosures hereof:

In the following discussion, the figures which are given relate to pine wood for simplification.

The heat treatment is carried out in presence of moisture, and is preferably accomplished by means of steam, and is called "steaming" in certain of our claims.

The wood or other material for supplying the fibrous ligno-cellulose substance, preferably in somewhat subdivided state, is heated to a temperature above 210° C., preferably about 250°–285° C., and in presence of moisture for a time sufficient, with the particular ligno-cellulose starting material used and at the temperature used, to produce alteration of the fiber structure generally throughout the body of ligno-cellulose material whereby at least the predominant proportion of and preferably the whole of the material is adapted for molding composition use by becoming at least in part non-fibrous, and becoming friable permitting it to be readily ground or powdered, and having the property of plastic flowability in hot pressure molding, and becoming readily compressible so that it can be compressed at the molding temperature by moderate pressures as 2000 lbs. per square inch to 1.35 sp. gr. or higher. In passing from use of temperatures under 210° C. to temperatures above 210° C. for such heat-treatment, a very noticeable and apparently critical change is observed in the water-resistance and plastic-flow characteristics of the product made by the heat-treated material being subjected to hot pressure molding operations. With temperatures for heat-treatment toward the upper part of the range, the time of treatment must be more than ratably shortened in order to prevent destructive alteration of the ligno-cellulose substance.

While the heat treatment with steam may be carried out in various ways and apparatuses, it is preferable to steam heat treat small pieces, as chips or sawdust, of the ligno-cellulose material in a vessel capable of sustaining high pressure and having a small outlet or outlets with provision for opening and closing same, such as the "gun" described in U. S. patent to Mason No. 1,824,221.

In such an apparatus the steam pressure and time of treatment can be regulated and adjustment of resin effect relative to filler effect controlled to make the molding material best adapted for the purposes to be served and to give superior results in molding and superior properties of the molded product. By opening the outlet when the steam heat treatment has progressed sufficiently, a good explosive subdivision is obtained throughout the entire body of ligno-cellulose material through its discharge by the steam pressure, and the hydrolysis or other alteration reactions going on can be stopped practically instantaneously through the reduction in pressure and temperature which takes place.

Partial predrying of the chips or other ligno-cellulose starting material is desirable in order to secure uniform treatment throughout all the ligno-cellulose material taken for treatment, and to permit more accurate control of the heat treatment.

By heating for example to about the average of the temperature range, viz. 250° C., with steam at the corresponding pressure, viz., about 600 pounds per square inch, and maintaining such full pressure for a period of about ¾ of a minute on gum wood chips, or about 1 minute on pine wood chips, and then explosively discharging into a region of atmospheric pressure, a material is produced which is altered throughout so that the predominant portion amounting to practically the whole thereof is adapted for molding composition use. Any coarse fiber which may be produced can be screened out or otherwise rejected. Molding composition material so produced is partially non-fibrous and partially fibrous and is well adapted for the manufacturing of sheet products involving felting as hereinafter described. For molding in closed molds, the molding composition may be dried to low moisture content, powdered and screened.

With steam at 285° C. (1000 pounds per sq. in.) 15 seconds of treatment at the full steam pressure will make a good molding composition material, from pine wood chips, which is partially non-fibrous. When the treatment is carried to, say, 20 seconds at 1000 pounds per square inch (285° C.), the material is comparatively non-fibrous and slimy as it issues from the gun. If dried and molded at 175° C., for example, the molded product has shrinkage strains which cause it to be weak and may cause it to crack. The detrimental properties can be corrected, however, to some extent at least, by admixture therewith of molding material less drastically processed and having more of the filler effect.

With a comparatively short time of heat treatment, a large proportion, as for example 23%, of water solubles is produced in the ligno-cellulose material. Further, when heat treatment is given at high temperature such as 285° C. and for a sufficient time as 15 seconds to produce a satisfactory molding composition there is little lowering of water solubles from such original figure of 23%, and the treated material should be washed for reduction of water solubles to about 3 or 4% in order to secure satisfactory water resistance in the final molded product. The treated material being in subdivided state may readily be processed for removal of water solubles by any suitable procedure such as agitating with preferably hot water and settling, filtering out and if desired pressing water containing solubles out of the resultant solid material. However, when heat treatment is given at low temperatures, such as 215 C. for a sufficient time as 30 minutes to secure a usable molding composition, the water soluble content of the treated material is greatly lowered, as for example the water solubles may be as low as 5 to 6%, in which case washing may not be necessary.

Grinding and passing through a fine screen is of advantage, particularly when molding in closed molds, as a means of getting the material remaining after rejection of such minor proportion of relatively coarse fiber as does not pass through the screens into a state for ready mixing and for uniform heat and pressure application throughout in molding operation.

The time and temperature at which the raw material is exposed in the presence of moisture for conversion into material suitable for molding composition varies with the raw material used and with the moisture content of the raw material as well as with the method of applying the temperature. However, for steam exploding of pine chips having a moisture content of about 25%, and for molding carried out for about 10 minutes at about 2000 lbs. per sq. in. at temperature of about 175° C., after washing to remove water solubles and drying to about 5% of water, the time and temperature relations listed below give a molding composition moldable into satisfactory, black, smooth surfaced articles having a specific gravity of about 1.42 and modulus of rupture of about 7500 lbs. per sq. in., and which upon boiling one hour in water and quenching with cold water will absorb not to exceed about 2½% water with no appreciable change in strength, color or surface smoothness and which are practically non-fading on prolonged exposure to light.

| Time held at pressure | Temperature in degrees centigrade | Steam pressure lbs. per sq. in. |
|---|---|---|
| 30 minutes | 216 | 300 |
| 5 minutes | 231 | 400 |
| 1¾ minutes | 244 | 500 |
| 1 minute | 254 | 600 |
| 30 seconds | 271 | 800 |
| 15 seconds | 285 | 1,000 |

The resultant molding composition material may vary from a light brown, fluffy condition to a hard granular condition very dark in color, depending on whether the heat and moisture treatment is less or more drastic. As thus prepared it can be molded alone with a small amount, as about 1%–11%, of moisture or other suitable plasticizer, into flat sheets or other forms, supplying within itself the constituents imparting resin effect and filler effect and water resistance. It can also be used in commercial molding compounds mixed with resins, filler, pigments, or other materials.

Limiting the heat and moisture treatment and the subsequent mechanical grinding or other subdivision treatment to retain at least a part of the heat-treated ligno-cellulose material in a fibrous or semi-fibrous state is of advantage for making sheet products in that it permits felting. Limiting in the following instance was of the subdivision or refining treatment. Pine chips steamed at about 250° C for 1 minute and exploded from the steam pressure corresponding to such temperature were found to give a good molding composition with satisfactory felting characteristics. The material coming direct from the gun with minimum or no grinding or other refining is so "free" that it can be formed from water into thick mats, and it can be dried (as in an air drier or in a press under light pressure) to a low moisture content, as 5%, or it may be made into more paper-like sheets of uniform thickness and enough of these sheets, as for example 20 sheets of paper board, piled together to give a product of the desired thickness, the mats or sheets having sufficient cohesion to permit handling into place between the heated press platens where the product is to be pressed or molded. Laminations between the layers of molding composition completely disappear in the practically amorphous molded sheet. For pressing or molding such partially fibrous molding material the pressure should be somewhat higher than with more completely refined material, as for example, 3000 lbs. per square inch.

In molding such mats or stacks of sheets between plane platens with the same unconfined at their edges, while the pressure and temperature and moisture conditions required for successful molding can be satisfactorily secured within the body of the sheet, there is a region at and near the free edges where such conditions are not all obtained, as by the flow releasing the pressure somewhat, or the moisture being driven off before the fusing or fluxing action can take place. When the finished sheet is removed, such outer marginal portion is found to take up water and lose strength relatively rapidly, and to retain much of its original color and structure, whereas successful molding has taken place in the inner part of the sheet, which is black, substantially amorphous, and highly dense, hard, strong and water-resistant. This apparently indicates that successful molding is dependent upon substantial completion of the conversion from partially fibrous to practically amorphous or plastic-flow state in the molding operation. Satisfactory sheet products can be obtained by trimming off such outer marginal portions, leaving the remainder of the sheet a hard, dense, black sheet product.

While molded pieces made in closed or pressure molds can usually be readily removed, flat sheets made in a hot platen press without confining at the edges sometimes have to be forcibly stripped from the platens. It is of advantage in making flat plates to make the surface sheets of the pile being pressed from a mixture, as a 50–50 mixture of the described molding composition with synthetic resinoid material such as formaldehyde-phenol resin, or the surface sheets may be impregnated with this or other resinous material or same may be applied by dusting on or in other ways, making it possible to get finished molded sheets with various surface appearances and finishes as well as always being sure that the sheet products are readily removable from the press when molded.

The molding composition of the present invention is capable of being molded at temperatures ranging up from about 120° C. to 220° C. or higher. It is in general more desirable to mold at the lower temperatures since chilling of the mold before the piece is removed is not so essential as at the higher temperatures, and at the lower temperatures mentioned the pieces may sometimes be removed without chilling. In addition, molding at the higher temperatures with subsequent chilling through a large range of temperature produces pieces which are weakened due to shrinkage strains although this can be compensated for to some extent at least and the strength increased by baking, as for example, baking 12 hours at 100° C. The time that the molding material is maintained under the temperatures mentioned for the purpose of producing a molded article varies according to the temperature used, type of molding composition, thickness of pieces and other factors from a minimum of about 1 minute for small, thin pieces up to 10 minutes or more.

The pressure used during the molding operation varies through a range of about 1000 to 4000 lbs. according to the type of molding composition, temperature of mold, moisture content and the presence of other plasticizers or lubricants.

Molded products made as described are of superior quality and permanence as regards strength, color and surface smoothness and are well adapted for general molded product uses by their good appearance, strength, hardness and density, water resistance, resistance to acids, dielectric strength and their low material and manufacturing costs. Bathroom tile is a representative example of the many uses for sheet products.

In certain of our claims we define the extent of the alteration treatment of the ligno-cellulose fiber substance with $H_2O$ above the critical temperature in terms of the specific gravity, strength and water resistance values obtained by molding such altered molding material under certain specified conditions. This is necessary because the molding material, while carrying within itself the characteristics which give values when molded, is ordinarily, as already stated, merely a brownish fluffy or granular material, not susceptible of being directly defined so as to properly distinguish same from other molding materials. The molding material is of course capable of being used with molding procedures other than those introduced into the claims to define extent of alteration.

We claim:

1. Molding composition material made by steaming ligno-cellulose material under pressure at a temperature above the critical temperature of the ligno-cellulose material for a time sufficient to alter the fiber structure throughout the predominant proportion of the material to a state of plastic flowability for hot pressure molding.

2. Molding composition material as claimed in claim 1 and made from wood.

3. Molding composition material made by steaming ligno-cellulose material under pressure at a temperature above the critical temperature of the ligno-cellulose material for a time sufficient to alter the fiber structure throughout the predominant proportion of the material to such state of plastic flowability for hot pressure molding that when molded for ten minutes at 2000 lbs. per square inch at a temperature of 175° C., for example, the specific gravity is over 1.35, the modulus of rupture over 7000 lbs. per square inch, and the water absorption after immersion in boiling water for one hour is not to exceed 2½%.

4. Molding composition material made from fibrous ligno-cellulose material by exposure to temperature at or over its critical temperature in the presence of steam for a time sufficient to alter the fiber structure throughout the predominant proportion of the ligno-cellulose material to a state of plastic flowability for hot pressure molding with a sufficient proportion thereof in substantially fibrous state to enable felting into sheets.

5. Process of making molding material from ligno-cellulose material comprising steaming ligno-cellulose material at a temperature at or above the critical temperature of the material for a time sufficient to alter the fiber structure throughout the predominant proportion of the material to a state of plastic flowability for hot pressure molding.

6. Process of making molding composition material from wood which comprises the step of steaming same in somewhat subdivided state at a temperature above the critical temperature of the wood, and which for pine wood is 210° C., and corresponding pressure until the fiber structure is altered throughout the predominant proportion of the wood fiber substance to a state of plastic flowability for hot pressure molding.

7. Process of making molding composition material from ligno-cellulose material which comprises the steps of steaming such ligno-cellulose material in somewhat subdivided state at a temperature above the critical temperature of the material which for pine wood is 210° C., and discharging from under the high pressure of steam at such temperature whereby the treated material is explosively disrupted, the steaming treatment being carried on for such period of time that the fiber structure is altered throughout the predominant proportion of the material to a state of plastic flowability for hot pressure molding.

8. Process of making a highly dense and water-resistant molded product from ligno-cellulose material comprising steaming ligno-cellulose material at a temperature at or above the critical temperature of the material for a time sufficient to alter the fiber structure throughout the predominant proportion of the material to a state of plastic flowability for hot pressure molding, and hot-pressing the treated material.

9. Process as in claim 8 and wherein the treated material is washed for removal of water solubles prior to hot-pressing.

10. Process as in claim 8 and wherein the treated material is washed for removal of water solubles and the moisture adjusted to 1–11% prior to hot pressing.

11. Process of making dense, water-resistant sheet products from ligno-cellulose material alone, which comprises the steps of steam-treating ligno-cellulose material in somewhat subdivided state at a temperature at or above its critical temperature for a time sufficient to alter the fiber structure throughout the predominant proportion of the ligno-cellulose material to a state of plastic flowability for hot pressure molding with a sufficient proportion thereof in substantially fibrous state to enable felting into sheets, felting the treated material into sheets from water, drying to about 1–11% of water content, and applying heat and pressure thereto.

12. Process as defined in claim 11 and in which a plurality of the sheets are piled together prior to final application of heat and pressure.

13. Process of making dense, water-resistant sheet products which comprises the steps of treating sub-divided fibrous ligno-cellulose material with heat and moisture until the ligno-cellulose substance is altered throughout the predominant proportion of the material to a state of plastic flowability for hot pressure molding with a sufficient proportion thereof in substantially fibrous state to enable felting into sheets, felting the heat-treated material into sheet form from water, adjusting the moisture content to about 1-11%, applying extraneous resin material to the sheet surface, and hot pressing whereby the surface of the sheet product is of the extraneous resin material.

14. Process of making from wood alone a dense, water-resistant molded product which comprises the steps of introducing wood in somewhat subdivided state into a closed vessel, applying steam at a temperature of about 210-285° C. to such material in said vessel until it gets up to corresponding pressure and for a material and predetermined time thereafter, discharging the contents of the vessel through constricted orifice whereby the wood is explosively disintegrated, the period of steam application being such that the wood fiber structure is altered throughout the predominant proportion of the material to a state of plastic flowability for hot pressure molding, and molding the treated material under pressure at a temperature over 120° C.

15. Process as in claim 13 and in which a plurality of the sheets are piled together prior to final application of heat and pressure.

16. A highly dense vitreous-like substantially homogeneous molded product having specific gravity over 1.35, modulus of rupture dry over 7000 pounds per square inch, and having high resistance to absorption of water, which product is comprised of several thin paper-like sheets made from ligno-cellulose material which was heat-treated with steam at above the critical temperature of the ligno-cellulose material for a time sufficient to alter the fiber structure throughout practically the whole of the ligno-cellulose material to a state of plastic flowability for hot pressure molding with a sufficient proportion thereof in substantially fibrous state to enable felting into sheets, and such paper-like sheets with plasticizer united into a substantially homogeneous body by application of heat and pressure.

17. Product as in claim 16 and having an outer surface comprising extraneous resin material.

18. Process of making vitreous-like highly-dense water-resistant molded products, which comprises the steps of steaming wood in subdivided state by introducing steam of approximately 300 to 1000 pounds per square inch pressure and temperature of approximately 215 to 285° C. into a closed chamber containing the subdivided wood until the pressure in the chamber is brought up to approximately the full steam pressure, continuing the treatment of the wood with said steam for a time sufficient to impart plastic flowability for hot pressure molding throughout practically the whole of the wood which is used, and which time for pine wood chips is approximately 30 minutes to approximately 15 seconds, terminating said treatment by opening a small outlet from the chamber to a region of approximately atmospheric pressure whereby the treated wood is discharged from the chamber and explosively disintegrated, and molding said material with a small percentage of plasticizer at a temperature of 120-220° C. and pressure of 1000-4000 pounds per square inch into the vitreous-like highly-dense water-resistant molded products.

WILLIAM H. MASON.
ROBERT M. BOEHM.
WILBUR EUCLID KOONCE.